United States Patent [19]
Fabris

[11] Patent Number: 5,771,266
[45] Date of Patent: Jun. 23, 1998

[54] DEVICE FOR JOINING TOGETHER TWO PLATES OF THE BAFFLE ASSEMBLY OF THE CORE OF A NUCLEAR REACTOR

[75] Inventor: Mirco Fabris, Jouy le Moutier, France

[73] Assignee: Framatome, Courbevoie, France

[21] Appl. No.: 619,355

[22] Filed: Mar. 21, 1996

[30] Foreign Application Priority Data

Mar. 22, 1995 [FR] France ................................... 95 03365

[51] Int. Cl.⁶ .................................................. G21C 15/10
[52] U.S. Cl. ......................... 376/287; 376/302; 403/260; 411/916
[58] Field of Search .................................... 376/287, 302, 376/446, 277, 463; 411/916, 917, 548; 403/230, 256, 257, 258, 260, 34, 39; 165/54, 134.1

[56] References Cited

U.S. PATENT DOCUMENTS

| 922,961 | 3/1909 | Schimpff | 165/54 |
|---|---|---|---|
| 2,320,398 | 6/1943 | Zetterquist et al. | 403/34 |
| 2,331,880 | 10/1943 | Zetterquist et al. | 403/34 |
| 3,357,890 | 12/1967 | Friis et al. | 376/289 |
| 4,069,102 | 1/1978 | Berringer et al. | 376/463 |

FOREIGN PATENT DOCUMENTS

| 0186012 A1 | 7/1986 | European Pat. Off. . |
|---|---|---|
| 2333325 | 6/1977 | France . |

Primary Examiner—Daniel D. Wasil
Attorney, Agent, or Firm—Pollock, Vande Sande & Priddy

[57] ABSTRACT

The device (15) for joining together a first plate (7) and a second plate (8) of the baffle assembly, which are located substantially at right angles, includes a screw (16) engaged in a housing consisting of an opening (18) passing through the first plate (7), and of a tapped blind opening (20) in the second plate (8). At least one opening (21) places an annular space (18b) around the shank (16b) of the screw in communication with the entry part (18a) of the opening (18) passing through the first plate (7), in order to deconfine the screw (16). The opening (21) may be a radial opening passing through a cup (17) against which the screw head (16a) comes to bear or an opening machined in the first plate (7) against a shoulder (18c) of the screw housing and the part (18b) of the opening for passing through the first plate (7) in which the shank (16b) of the screw (16) is engaged.

11 Claims, 7 Drawing Sheets

DEVICE FOR JOINING TOGETHER TWO PLATES OF THE BAFFLE ASSEMBLY OF THE CORE OF A NUCLEAR REACTOR

FIELD OF THE INVENTION

The invention relates to a device for joining two plates of the baffle assembly surrounding core of a nuclear reactor cooled by pressurized water.

In particular, the joining device according to the invention is designed to replace a screw-fastening device which has become defective, for example through the screw breaking.

BACKGROUND OF THE INVENTION

Pressurized-water nuclear reactors include, inside a vessel, a core consisting of juxtaposed fuel assemblies held, around the periphery of the core, by a baffle assembly itself located and held inside a core barrel of cylindrical shape. The core baffle assembly consists of plates joined together by fastening devices including joining screws. Some of the plates, arranged vertically so as to hold the peripheral assemblies of the core, and called baffles, are joined together in pairs at right angles in order to form a prismatic holding assembly, the section of which has a complex shape. The baffle assembly also includes a second set of plates, called reinforcements, arranged horizontally between the core barrel and the baffles. The reinforcements, which are spread out at uniform distances over the height of the baffle assembly and of the core, are fixed to the baffles by screws.

The baffle assembly of the core, which is interposed between the peripheral assemblies of the core and the core barrel, has many fastening devices comprising screws for joining together two plates arranged at right angles. The two plates joined together by the screwfastening devices may be two baffles or one baffle and one reinforcement.

When the nuclear reactor is in service, the core assemblies, the baffle assembly and the devices for fastening the plates of the baffle assembly are in contact with the fluid used to cool the nuclear reactor, which fluid consists of water at a very high pressure and temperature and containing certain chemical additives. Those devices for fastening the baffle plates which are located in regions very close to the core assemblies are heated greatly and, in some parts, are in contact with the cooling water which does not participate in the circulation of the coolant through the core and which, as a result, is not renewed.

The screws of the devices for fastening the plates of the baffle assembly, some parts of which are exposed to a confined liquid at very high temperature, may, within the operating reactor, be subjected to thermal and mechanical stresses and to significant corrosion.

Moreover, some breakages of screws in the baffle assembly have been observed, and in order to prevent the heads of broken screws from becoming loose parts within the vessel and the primary circuit of the reactor, the fastening screws are immobilized and rendered captive, at the time when they are being installed, using spots of welding between the screw head and the baffle assembly.

In order to limit the corrosion of the fastening screws and prevent them from breaking in the reactor in service, FR-A-2,333,325 has proposed providing ducts for the passage of fluid around the shank of the screws, inside the plates which they are used to fasten as well as and ducts passing through one of the plates or machined in the screw in order to deconfine the annular space formed around the shank of the screw. In this way, coolant can circulate in contact with the fastening screws, through the baffle assembly. Thus, any effect of a confined fluid in contact with the screws boiling or becoming concentrated is avoided.

However, in order to allow circulation of fluid in contact with the screws, through the baffle assembly, it is necessary to carry out special machining of the baffle assembly and/or of the fastening screw.

Making drillings in the metal of the screw weakens the latter and reduces its resistance to corrosion in the reactor in service.

In the case where fastening screws which have broken in the reactor in service are being replaced, it is very difficult, if not impossible, to carry out certain machining of the baffle assembly in regions to which it is difficult or impossible to gain access. In addition, the machining has to be carried out remotely and underwater, owing to the contamination of the baffle assembly.

SUMMARY OF THE INVENTION

The object of the invention is therefore to propose a device for joining together a first metal plate and a second metal plate of the baffle assembly surrounding the core of a nuclear reactor cooled by pressurized water, these plates being located substantially at right angles and in contact with each other. The joining device includes a screw having a shank which is threaded over at least part of its length and a head having a diameter greater than the diameter of the shank, an opening passing through the first metal plate and exhibiting an entry part, the diameter of which is greater than the diameter of the head of the screw, an exit part, the diameter of which lies between the diameter of the head and the diameter of the shank of the screw and a shoulder between the entry part and the exit part, and a tapped blind opening in the second plate. The joining device makes it possible in a simple manner to prevent from isolation from coolant in contact with the shank of the screw without making drillings in the screw.

To this end, the joining device according to the invention includes at least one opening for placing a first annular space around the screw head inside the entry part of the opening in communication with a second annular space around the shank of the screw inside the exit part of the opening.

BRIEF DESCRIPTION OF THE DRAWINGS

In order to make the invention easy to understand, several embodiments of a joining device according to the invention will now be described by way of example with reference to the appended drawings.

DESCRIPTION OF PREFERRED EMBODIMENT

Figure 1:
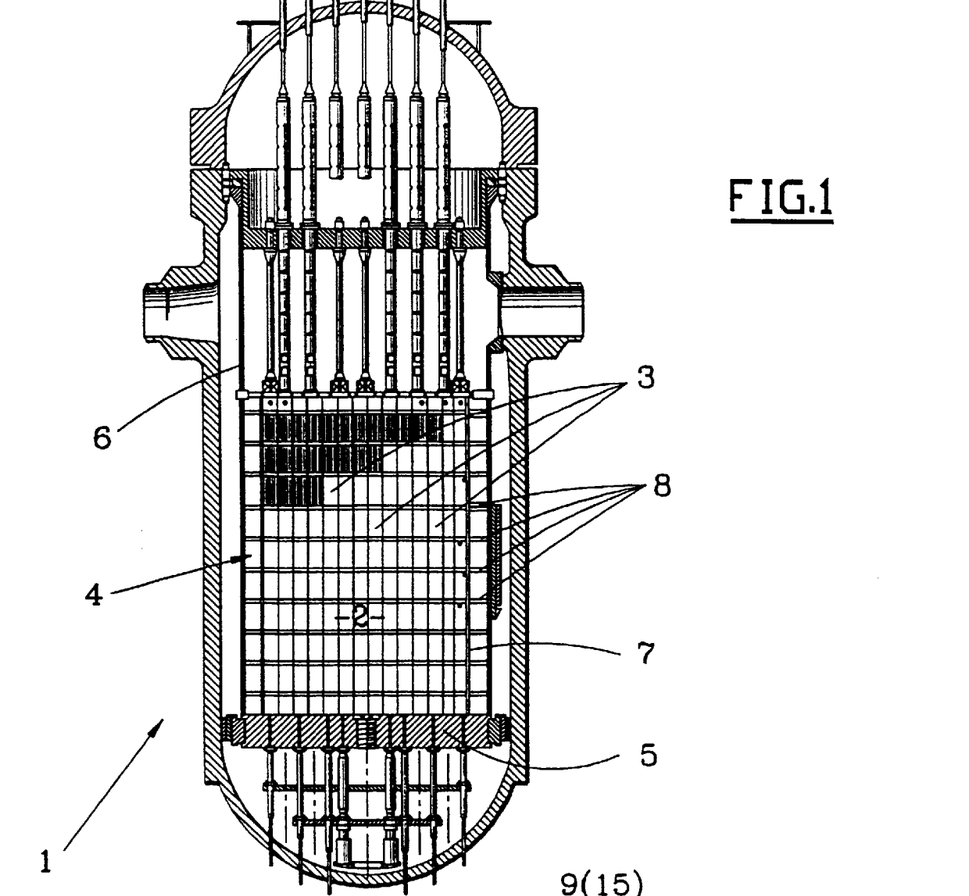
FIG. 1 is a view in elevation and in part section of the vessel of a pressurized-water nuclear reactor.

FIG. 1 shows the vessel 1 of a pressurized-water nuclear reactor, inside which is located the reactor core 2 consisting of fuel assemblies 3 of prismatic shape placed in a juxtaposed manner and resting via their lower end on a support plate 5.

The core assembly is located inside a core barrel 6 suspended and fastened inside the vessel 1. The fuel assembly support plate 5 is fastened onto the core barrel.

A baffle assembly 4 which holds the fuel assemblies 3 inside the core is interposed between the outer peripheral part of the core 2 and the internal surface of the core barrel 6.

The baffle assembly 4 consists of vertical baffles 7 and reinforcements 8 arranged horizontally between the baffle plates 7 and the core barrel 6 and distributed over the height of the core.

Figure 2:
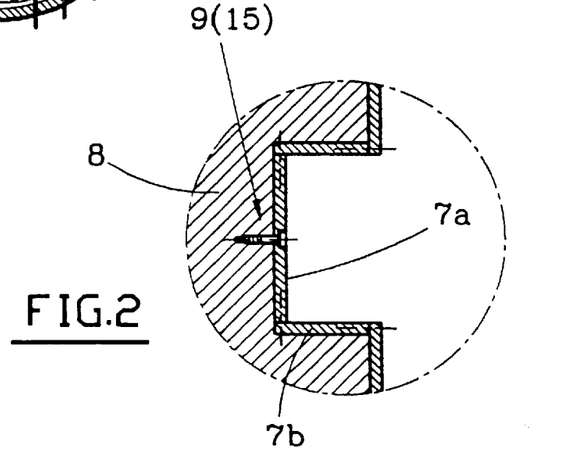
FIG. 2 is a plan view and in section through a horizontal plane of part of the baffle assembly located inside the reactor vessel represented in FIG. 1.

As can be seen in FIG. 2, the plates such as 7a, 7b of the baffle assembly are pulled together and fastened to each other in a right-angled configuration. The plates 7a and 7b, are joined together by devices including screws which are engaged in openings in the baffles 7a and 7b, these openings being made in their region of contact. Likewise, the reinforcements such as 8 are joined to the vertical baffles 7 of the baffle assembly by screwed joints.

Figure 3:
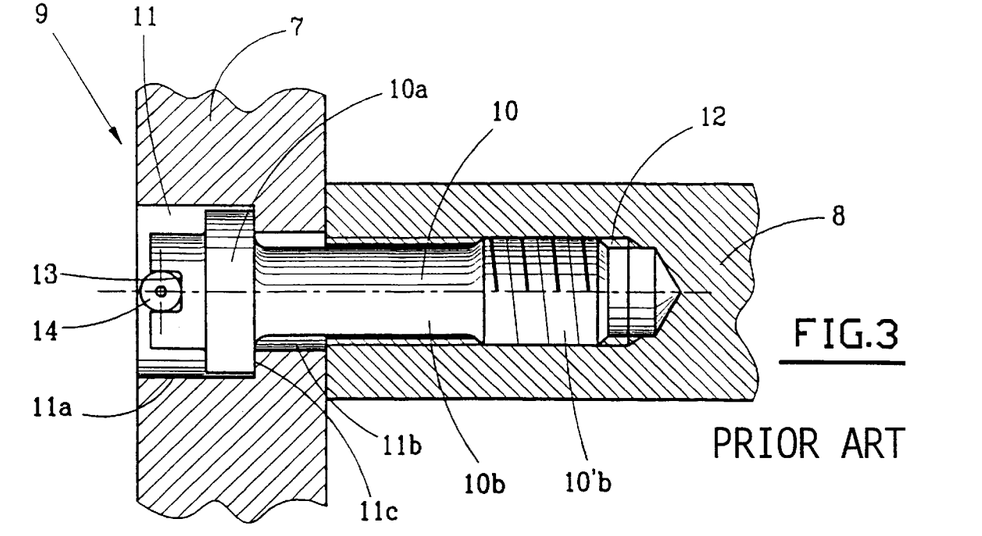
FIG. 3 is a view in section of two baffle plates joined together by a fastening device according to the prior art.

FIG. 3 represents a prior art fastening device 9 used to join together two baffle plates 7 and 8 which may, for example, be one baffle, e.g. baffles 7a or 7b represented in FIG. 2, and a reinforcement 8. The joining device 9 includes a screw 10 engaged inside openings 11 and 12 in the plates 7 and 8 respectively located in the extension of each other and constituting the elements of the joining device which complement the screw 10.

The opening 11 passes through the entire thickness of the plate 7 and has an entry part 11a, the diameter of which is greater than the maximum diameter of the screw head 10a and an exit part 11b, the diameter of which is somewhere between the diameter of the screw head 10a and the diameter of the shank 10b of the screw.

The shank 10b of the screw has a threaded part 10'b which is screwed into the opening 12 in the plate 8 in the form of a tapped blind hole.

The parts 11a and 11b of the opening 11 having different diameters are separated by a shoulder 11c against which the head 10a of the screw bears in its tightened and joining position, as represented in FIG. 3.

The upper part of the screw head 10a has a slot 13 allowing engagement of a tool for screwing the screw 10, when the baffle assembly is put together.

After the screw 10 has been tightened, a pin 14 is inserted into the slot 13 in the screw head 10a, and the ends of the pin 14 are welded onto the baffle plate 7, inside the widened part 11a of the opening 11.

Should the shank of the screw 10 breaking below the head 10a, while the reactor is in operation, the head 10a which is held by the pin 14 remains in place inside the opening 11. As can be seen in FIG. 3, the part 11b of the opening 11 around the shank 10b of the screw 10 and the part of the opening 12 of the plate 8 around the shank of the screw 10b constitute spaces which are closed by the screw head 10a bearing against the shoulder 11c. Water for cooling the reactor is trapped and confined in these two spaces where it can come to the boil and give rise to concentration phenomena leading to greater corrosion of the screw 10.

In order to produce ducts for the circulation of cooling water around the shank of the screw, as described in FR-A-2,333,325, it would be necessary to carry out additional machining of the plates 7 and 8, and of the screw 10.

In particular, when a screw 10 which is broken in the reactor in service is being replaced, it may be desirable to carry art additional machining on the baffle plates, so as to provide a circulation of coolant around the replacement screw. These machining operations must to be carried out underwater and remotely. Furthermore, the reinforcement plates 8 of the baffle assembly are inaccessible, only the baffles 7 being accessible from inside the baffle assembly.

Figures 4, 5:
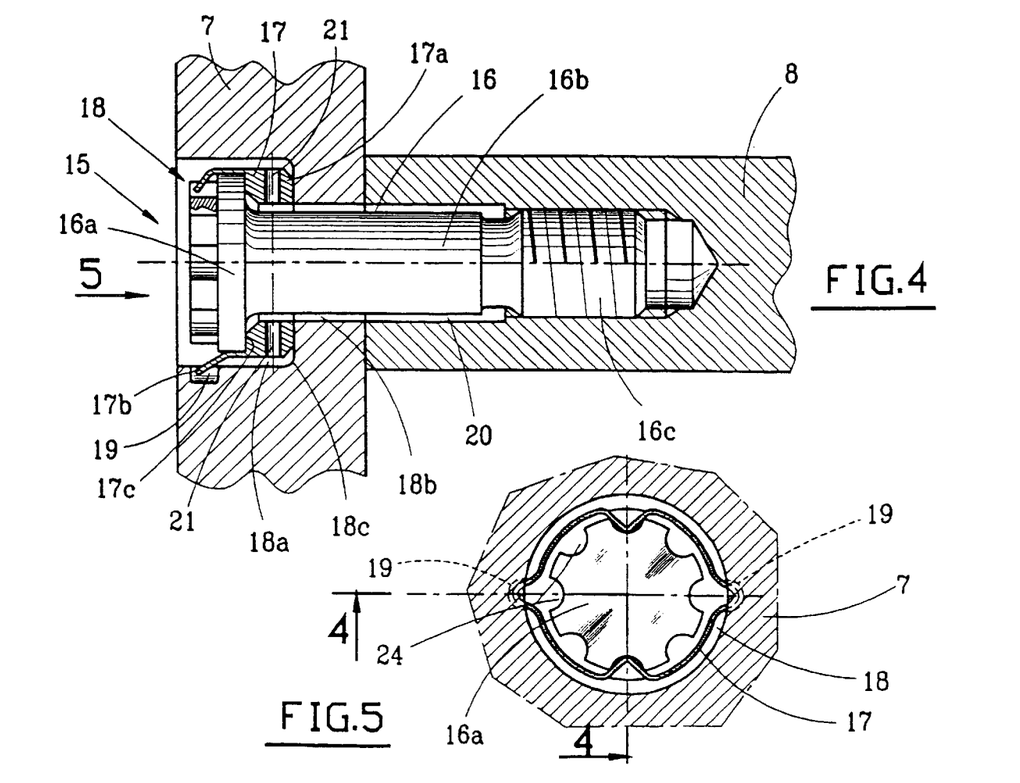
FIG. 4 is a view in section similar to the view in FIG. 3 of two baffle plates and of a joining device according to the first embodiment of the invention.
FIG. 5 is a view in the direction of arrow 5 of FIG. 4.

FIG. 4 represents a device for joining together two baffle plates, according to a second embodiment of the invention, which makes it possible in a very simple manner to create a space for the circulation of cooling water around the shank of a joining screw.

FIGS. 4 and 5 represent a joining device according to the invention which can be substituted for an assembly according to the prior art, as represented in FIG. 3, for example, following breakage of the screw 10 of the assembly 9.

Such a replacement and repair may be carried out while the reactor is shut down, inside the water-filled cavity of the reactor.

The joining device according to the invention, which makes it possible to avoid the drawbacks of the device according to the prior art mentioned hereinabove, may also be fitted in order to fasten plates of the baffle assembly, when building a new baffle assembly.

FIGS. 4 and 5 represent the joining device is according to the invention.

The joining device 15 consists of a housing produced by machining inside the plates 7 and 8 to be joined together, a screw 16 for clamping and joining the plates 7 and 8 together, and a cup 17 interposed between the screw head and part of the housing for accommodating the screw inside the plate 7.

The housing for the screw 16 inside the plates 7 and 8 is produced by remachining the openings 11 and 12 in the plates 7 and 8, after the broken screw 10 has been removed.

Removal of the screw 10 is carried out by machining the pin 14 which holds the screw head in order to detach it from the plate 7, by cutting off the screw head, and then by unscrewing or machining away the shank of the screw, in order to extract it from the opening in the plate 8. The remachining of the openings in the plates 7 and 8 includes reboring the part 11a of the opening 11 passing th rough the plate 7 constituting a vertical baffle in order to obtain a new, diametrically widened, entry part 18a of the opening 18 passing through the plate 7. The exit part 18b of the opening 18 in the plate 7 which has been remachined may consist of the part 11b of the opening 11 or of the part 11b of the slightly rebored opening 11.

The diameter of the entry part 18a of the through-opening 18 is greater than the diameter of the screw head 16a and also greater than the outside diameter of the cup 17. The diameter of the exit part 18b of the through-opening 18 is less than the diameter of the part 18a and greater than the diameter of the shank 16b of the replacement screw 16.

A shoulder 18c separates the part 18a and 18b of the through-opening.

Two diametrally opposite notches 15 in the opening 18 are machined in the wall of the widened part 18a of the opening 18, at a distance from the external face of the plate 7.

The opening 12 in the plate 8 which constitutes a horizontal reinforcement is remachined, in the form of a smooth hole, the diameter of which is greater than the diameter of the shank 16b of the screw 16 and substantially equal to the diameter of the exit part 18b of the through-opening 18. The lower part of the tapped blind hole 12 is not remachined, so that the blind hole 20 in the plate 8 obtained by remachining the blind hole 12 and forming part of the housing for the screw 16 has a smooth entry part, the diameter of which is greater than the diameter of the shank of the screw, and a tapped part into which a threaded part 16c of the shank 16b may be screwed.

The cup 17 has an annular overall shape and has a lower part 17a coming to bear via its end against the shoulder 18c of the opening 18. The bore of the cup 17, in the part 17a, is greater than the diameter of the shank 16b of the screw 16 and substantially equal to the diameter of the exit part 18b of the opening 18 or of the smooth entry part of the opening 20. Radical ducts 21 pass through part 17a and extend between the external surface of the cup 17, inside the widened opening 18a, and the internal bore of the part 17a of the cup around the shank 16b of the screw 16. The ducts 21 place the annular space left around the shank of the screw by the parts 18b and 20 of the housing in communication with the entry part 18a of the opening 18 communicating with the inside of the baffle assembly accommodating the reactor core assemblies.

The cup 17 has a part 17b extending the part 17a in the opposite direction to the end of the cup which comes to rest on the shoulder 18c. The part 17b of the cup is produced in the form of a ring, the thickness of which is very much less than the thickness of the part 17a of the cup. The thin annular part 17b of the cup 17 can be deformed inside the notches 19 machined inside the opening 18a. This prevents the cup 17 from rotating and retains it axially inside the opening 18, through the ring 17b being crimped into the notches 19.

The head 16a of the screw 16 has an external part bounded by a planar surface which is perpendicular to the axis of the screw and has substantially semicircular recesses 24, as can be seen in FIG. 5, on a lateral surface, coaxial with the screw. The recesses 24 make it possible to screw and unscrew the screw 16 using an appropriate tool, and without providing a slot in the screw head. In this way, it is possible to use a screw the head of which is shorter than than of the the screws according to the prior art, generally slotted to take a screwdriver blade and a locking pin welded to the plate of the baffle assembly.

The completely planar shape of the external surface of the screw head 16a makes it possible to facilitate checking of the screw, for example by ultrasound.

The deformable ring 17b of the cup 17 is deformed inwards to extend into two of the recesses 24 which are aligned on a diameter of the screw head. Thus, by crimping the ring 17b, the screw head and the screw are prevented from rotating, relative to the cup 17, which is itself prevented from rotating inside the opening 18, by crimping inside the two notches 19.

After the openings 18 and 20 have been re-machined, the screw 16 engaged inside the cup 17 is put in place inside the housing consisting of the openings 18 and 20, and then the screw 16 is screwed into the tapped part of the opening 20. After screwing, the internal shoulder of the head 16a comes to bear against a shoulder 17c inside the cup 17 separating the thin ring 17b from the part 17a of the cup. The internal bore of the ring 17b is equal to or greater than the maximum diameter of the screw head 16a.

After the screw 16 has been screwed and tightened, the ring 17b of the cup 17 is deformed outwards so as to extend into the notches 19 and inwards so as to extend into two diametrically opposed openings 24. The screw is thereby prevented from rotating and the cup is held inside the opening 18 in the plate 7.

In addition, the annular space between the shank 16b of the screw 16 and the housing for the screw is placed in communication, via radio ducts 21, with the entry part 18a of the opening 18, itself communicating with the space inside the reactor core. The coolant coming into contact with the shank of the screw is therefore not confined and isolated, and this prevents it from boiling and avoids the effects of the chemical species contained in the coolant becoming concentrated. Thus the risks of degradation and breakage of the replacement screw 16 are limited.

The joining part between the head 16a and the shank 16b of the screw 16 preferably has a rounded shape, improving the mechanical properties of the screw.

The shank of the screw also includes, between its external smooth part and its threaded part 16c, a neck of rounded shape.

Figure 6:
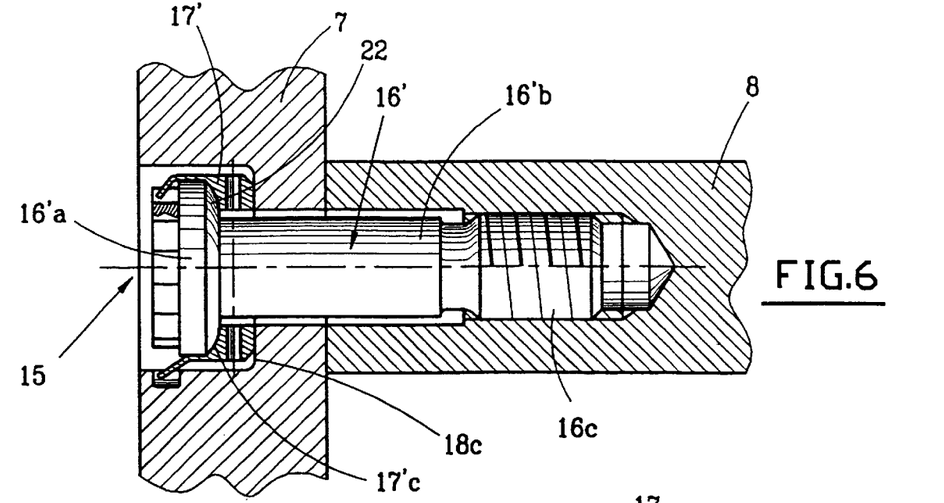
FIG. 6 is a view in section similar to the view of FIG. 4 of two baffle plates and of a joining device according to the second a embodiment.

FIG. 6 represents a second embodiment of a joining device 15 according to the invention. The corresponding elements of the device represented in FIGS. 4 and 6 are denoted by the same references.

The housing for the screw 16, inside the plates 7 and 8 to be joined together, is the same way as in the case of the device represented in Figure.

The cup 17' of the joining device according to the embodiment represented in FIG. 6 is slightly different from the cup 17 of the device represented in FIG. 4, in that it includes, between its internal part bearing against the shoulder 18c of the opening 18 and the deformable ring constituting its external part, a bearing surface 17'c in the form of a concave spherical sector which replaces the flat shoulder against which the screw head 16a comes to bear in the embodiment represented in FIG. 4. The screw 16' according to the embodiment represented in FIG. 6 itself includes, between its head part 16'a and the shank 16'b, a bearing shoulder 22 consisting of a convex spherical sector, the shape of which corresponds to the shape of the concave spherical sector 17'c of the cup 17'. Thus centering and tightening of the screw 16' against the cup 17' are improved, and simultaneously the stresses to which the screw is subjected in the region between the head and shank are reduced.

Figures 7, 8:
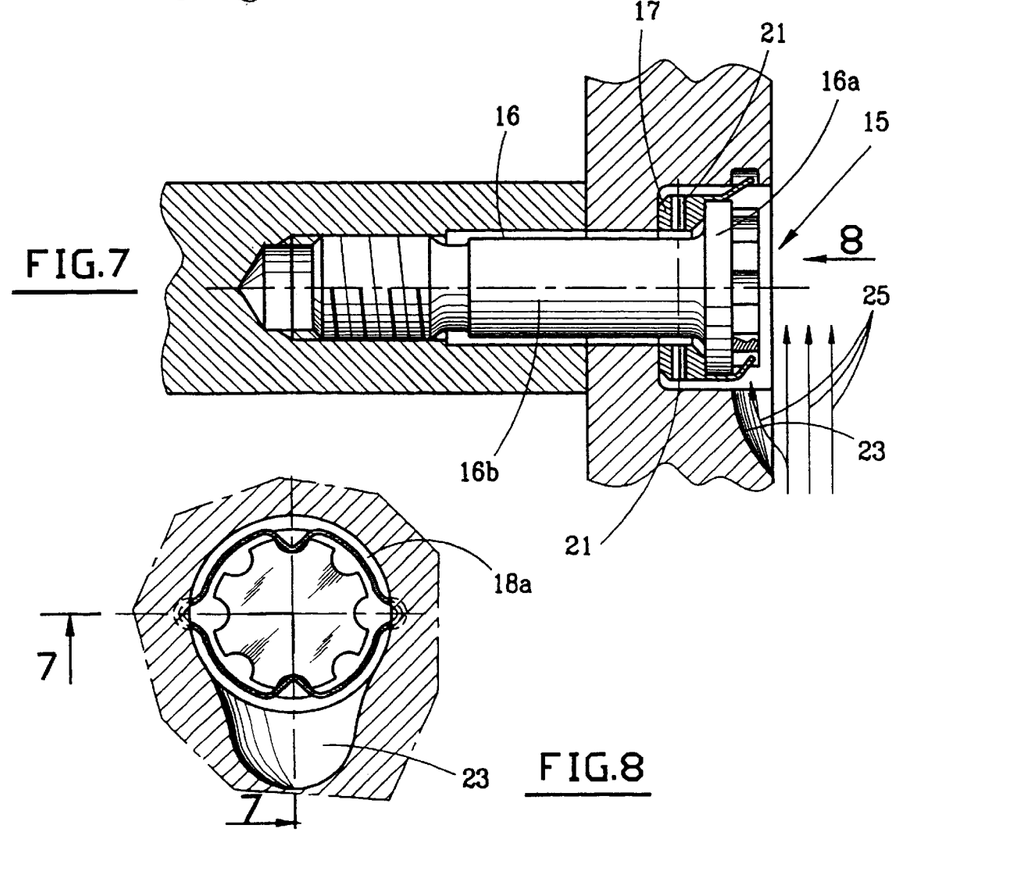
FIG. 7 is a view in section of two baffle plates and of a joining device according to a third embodiment and according to a second alternative embodiment.
FIG. 8 is a view in the direction of arrow 8 of FIG. 7.

FIGS. 7 and 8 represent a third embodiment of a joining device 15 according to the invention.

The screw 16 and the cup 17 of the device 15 according to the this embodiment are identical to the corresponding elements in the embodiment represented in FIGS. 4 and 5.

The housing of the screw 16 is also substantially identical to the housing for the screw in the case of the first embodiment. However, additional machining is carried out on the external surface of the baffle 7, that on that surface of the vertical plate which comes into contact with an assembly inside the reactor core, this additional machining having the shape of a recess 23 extending the entry part 18a of the opening 18 downwards. Additionally, the recess 23 has a curved surface inclined in the direction of the reactor core.

In FIG. 7, arrows 25 represent the direction of travel of the cooling water inside the reactor core, close to the internal surface of the plate 7. The water for cooling the reactor circulates around the core in the vertical direction and from the bottom upwards. In the region of the recess 23, the water flow circulating at high speed penetrates the recess and strikes the screw head 16a. The stream of cooling water is thus deflected towards the ducts 21 of the cup 17 and in the direction of the annular space around the shank 16b of the screw 16. Thus, exchanges between the fluid circulating inside the core and the fluid contained within the annular space around the shank of the screw are initiated. The confinement of the fluid and the risks of boiling and of concentration of chemical products in the annular space around the shank of the screw are therefore reduced further.

Owing to the fact that the length of the head of the screw of the joining device according to the first embodiment of the invention is less than the corresponding dimension of joining screws according to the prior art, it is possible to increase the length of the shank of the screw, thereby decreases the stress levels in the junction part between the head and the shank of the screw.

FIGS. 9 to 18 relate to a second embodiment of a joining device according to the invention.

In the case of the first embodiment represented in FIGS. 4 to 8, the openings allowing the annular space situated around the screw head inside the entry part of the screw hole inside the baffle to be placed in communication with the annular space situated around the shank of the screw inside the exit part of the opening of the hole by which the screw passes through the baffle so that they passed radially through a cup interposed between the screw head and the shoulder of the screw housing, the cup also including a ring allowing the screw to be prevented from rotating in the housing.

In the case of the second embodiment represented in FIGS. 9 to 18, the annular space around the screw head is placed in communication with the annular space around the shank of the screw by means of openings machined in the housing in the baffle.

These openings are designed so that they can be made by machining the baffle from inside the baffle assembly.

Thus, in contrast with the reinforcements, which are not accessible from inside the baffle assembly, the baffles are accessible during maintenance and repair operations after the nuclear reactor has been shut down, and certain machining operations may be carried out inside the part of the housing passing through the baffle.

FIGS. 9 to 18 represent three different embodiments of a joining device according to the invention, in which the annular space around the screw head is placed in communication with the annular space around the shank of the screw by an opening machined in part of the baffle which is accessible from inside the baffle assembly.

The corresponding elements represented in Figures 9 to 18 are denoted by the same references.

The overall structure of the joining device will be described with reference to FIGS. 9 and 11, this overall structure being identical in the case of the joining device according to the first variant represented in FIGS. 9 and 11, the second variant represented in FIGS. 12 and 14 the third variant represented in FIGS. 15 and 17.

Figure 9:
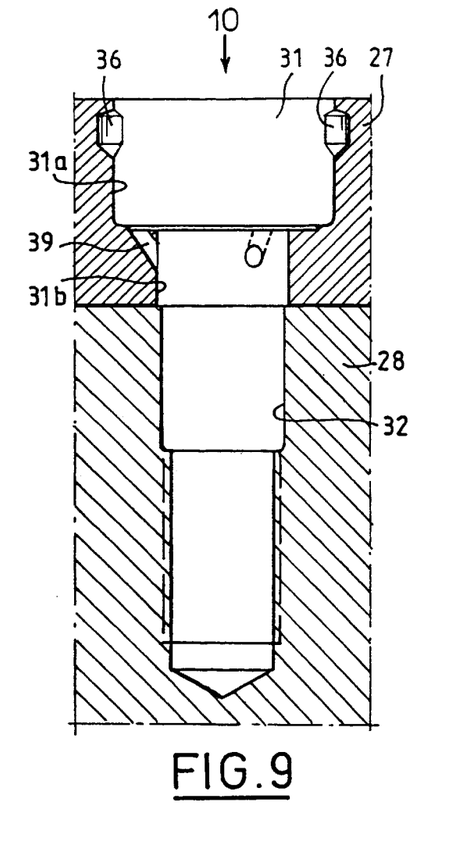
FIG. 9 is a view in axial section of the housing of a screw of a joining device according to a second embodiment thereof.
Figure 11:
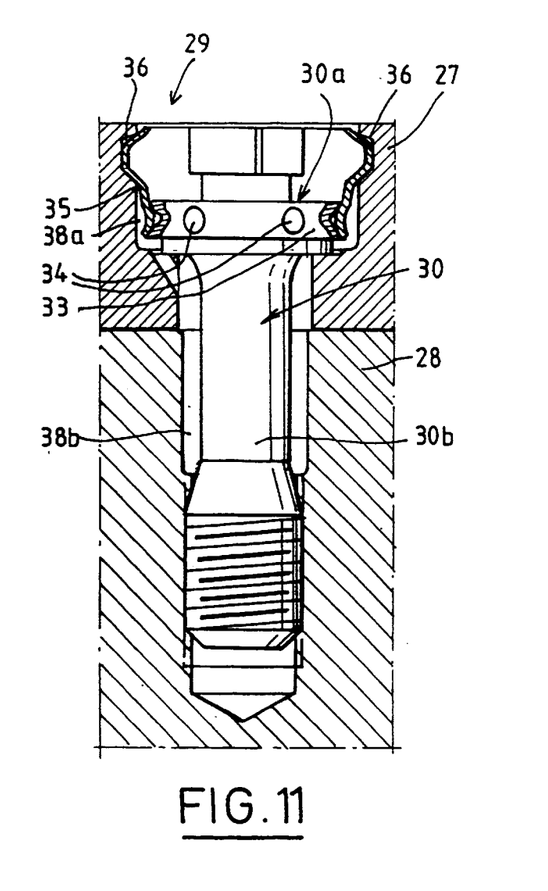
FIG. 11 is a view in part axial section of the joining device according to the invention and according to a further embodiment.

The joining device, 29, allows a baffle 27 and a reinforcement 28 which are represented in a view in section through a horizontal plane in FIGS. 9 and 11, to be joined together.

Passing through the baffle 27 is an opening 31 including a large-diameter entry part 31a and a small-diameter exit part 31b.

An opening 32 including a tapped end part is machined inside the reinforcement 28, axial alignment with the opening 31.

A screw 30 engaged in the openings 31 and 32 is screwed into the tapped part of the opening 32.

Figure 18:
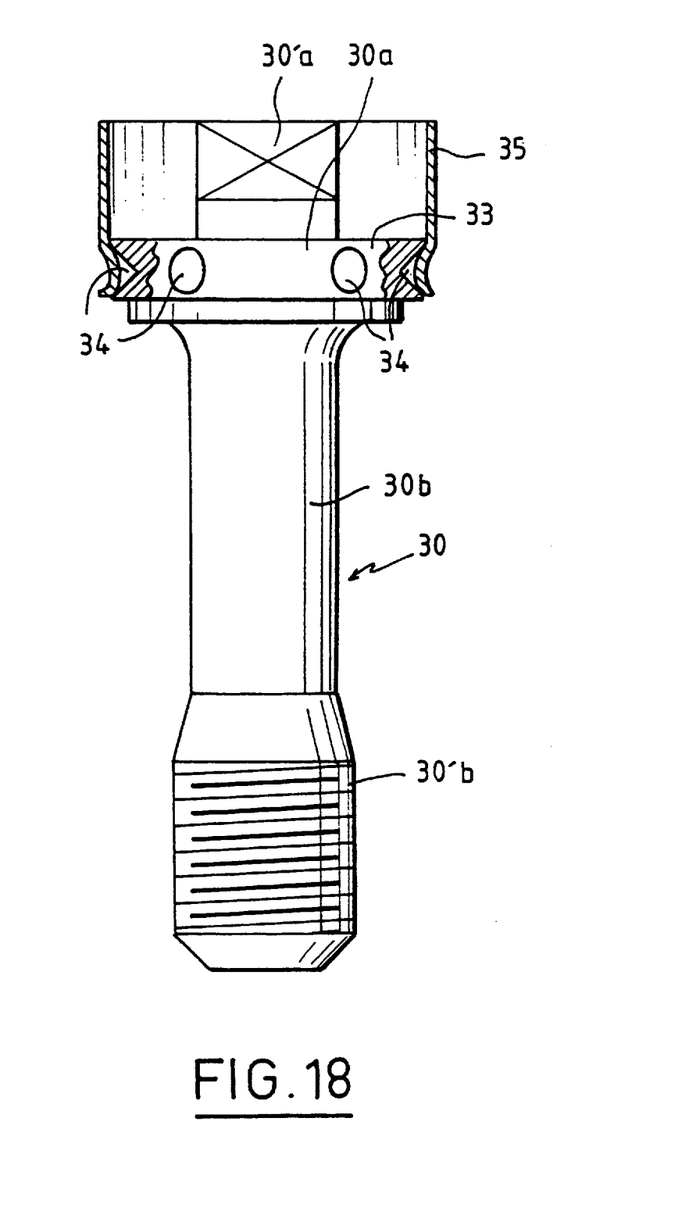
FIG. 18 is a view in elevation and in part section of a screw of a joining device according to a further embodiment.

The screw 30, which is represented in FIG. 18, includes a head 30a and a shank 30b including a threaded part 30'b to be screwed into the tapped part of the opening 32.

The screw head 30a has a profiled part 30'a allowing screwing and unscrewing using a tool, and a collar 33 ending in the shoulder by which the screw head bears, in which six cavities 34 evenly spaced at the periphery of the collar 33 are machined.

A ring 35 made of deformable metal, the inside diameter of which is substantially equal to the diameter of the collar 33, is slipped over the collar 33 and deformed into the cavities 34 so that there is a crimped connection between the deformable ring 35 and the screw head 30a.

After the screw 30 has been screwed into the opening 31, 32 in the baffle 27 and in the reinforcement 28, the screw 4 is prevented from rotating, and the head and the shank of the screw are retained inside the openings 31 and 32 by crimping the deformable ring 35 into four cavities 36 machined in the large-diameter entry part 31a of the opening 31 arranged substantially at 90° about the axis of the opening 31.

As can be seen in FIG. 11, the part 33 of the screw head 30a has a diameter substantially smaller than the diameter of the entry part 31a of the opening 31 passing through the baffle, so that an annular space 38a remains around the screw head inside the opening 31. As the cavities 36 and the crimped parts of the deformable ring 35 are not continuous around the circumference of the ring 35, the annular space 38a is in communication with the interior space of the baffle assembly via the entry of the opening 31.

The smooth part of the shank 30b of the screw 30 has a diameters substantially smaller than the diameter of the exit part 31b of the opening 31 and than the diameter of the opening 32. An annular space 38b therefore remains around the shank of the screw inside the openings 31b and 32.

According to the invention, the screw is deconfined by providing openings which place the annular spaces 38a and 38b in communication.

This construction allows nuclear reactor cooling water circulating inside the baffle assembly to come into contact with the shank of the screw, which thus becomes deconfined.

Figure 10:
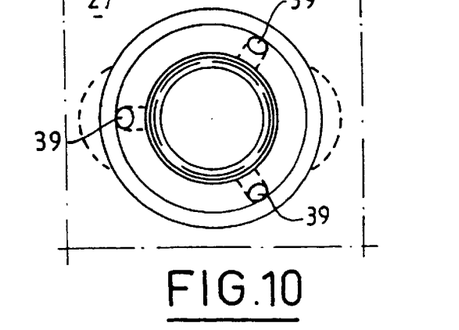
FIG. 10 is a view from above on 10 of FIG. 9.

According to the embodiment represented in FIGS. 9, 10 and 11, three straight openings 39 are drilled through the baffle 27 at an angle to the axis of the screw between the bottom of the part 31*a* of the opening 31 and the part 31*b* of the opening 31.

As can be seen in FIG. 10, the axes of the three openings 39 lie in planes which pass through the axis of the openings 31 and 32 and form dihedral angles of 120° with one another.

As can be seen in FIG. 11, when the screw is engaged and fixed in the openings 31 and 32, the bearing shoulder 30*a* of the head coming to bear in a cavity machined at the bottom of the part 31*a* of the opening 31 covers the entry parts of the openings 39 only partially, so that these openings provide communication between the annular spaces 38*a* and 38*b*.

Figure 12:
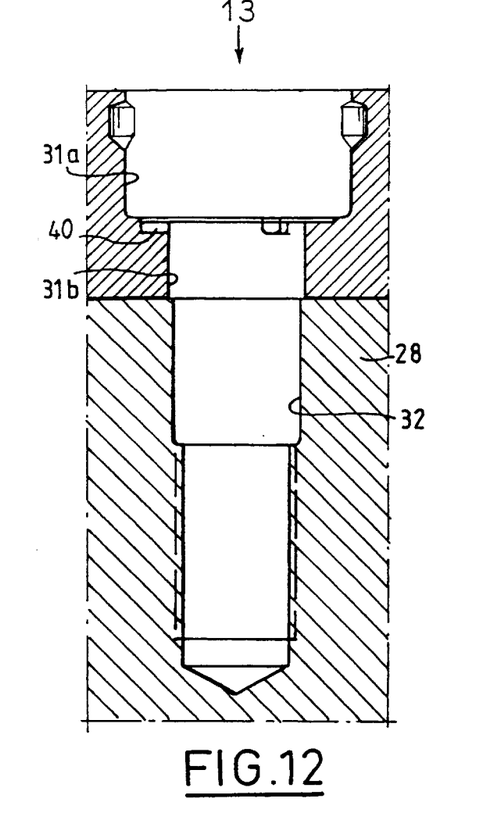
FIG. 12 is a view in axial section of the housing of a screw of a joining device according to the invention and according to a still further embodiment.
Figure 13:
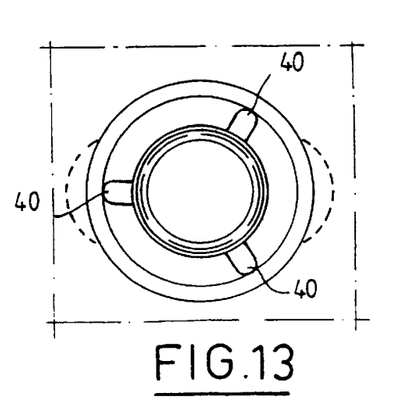
FIG. 13 is a view from above in the direction of arrow 13 of FIG. 12.
Figure 14:
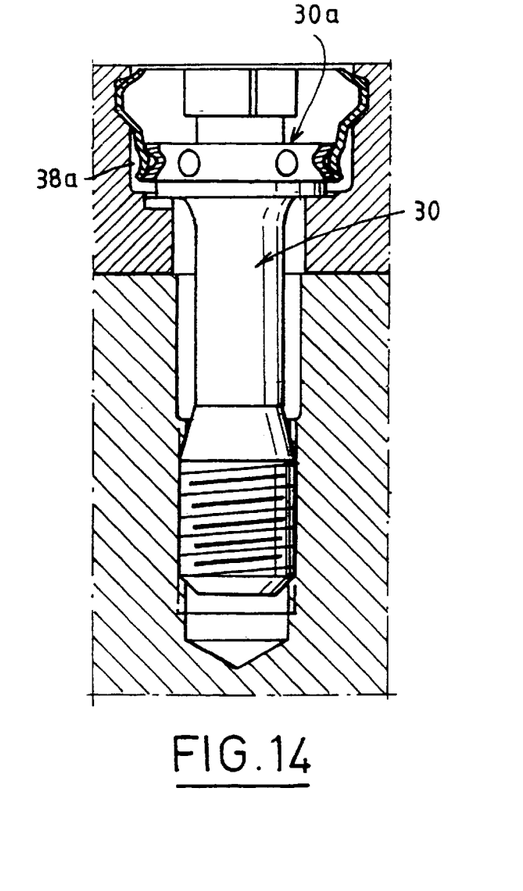
FIG. 14 is a view in axial part section of the joining device according to the invention and according to a further embodiment.

According to embodiment represented in FIGS. 12, 13 and 14, three grooves 40 are machined perpendicular to the axis of the openings 31 and 32 in the bottom of the entry part 31*a* of the opening 31.

At one of their ends, the grooves 40 emerge in the part 31*b* of the opening 31 and extend radially toward the outside beyond the bearing shoulder of the screw 30 (see FIG. 14).

In addition, an annular cavity is machined in the bottom of the opening 31, into which cavity the shoulder of the screw head 30*a* comes to bear. As can be seen in FIG. 13, three radial grooves 40 forming angles of 120° between them are provided.

Because the grooves 40 emerge at one of their ends into the annular space 38*b* and at their other end into a region of the bottom of the part 31*a* of the opening 31 outside the bearing shoulder of the screw head 30*a*, communication between the spaces 38*a* and 38*b* and deconfinement of the shank of the screw 30 are obtained.

Figure 15:
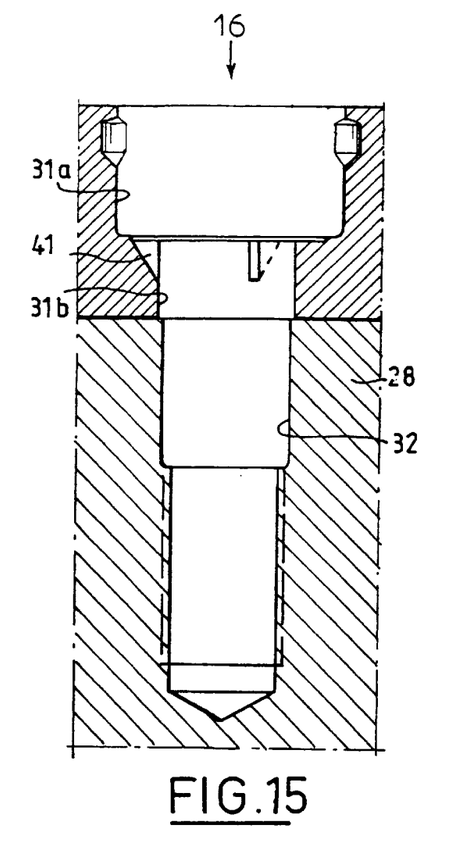
FIG. 15 is a view in axial section of the housing of a screw of a joining device according to a further embodiment.
Figure 16:
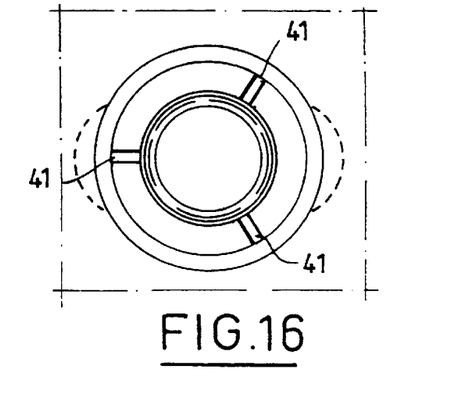
FIG. 16 is a view from above in the direction of arrow 16 of FIG. 15.
Figure 17:
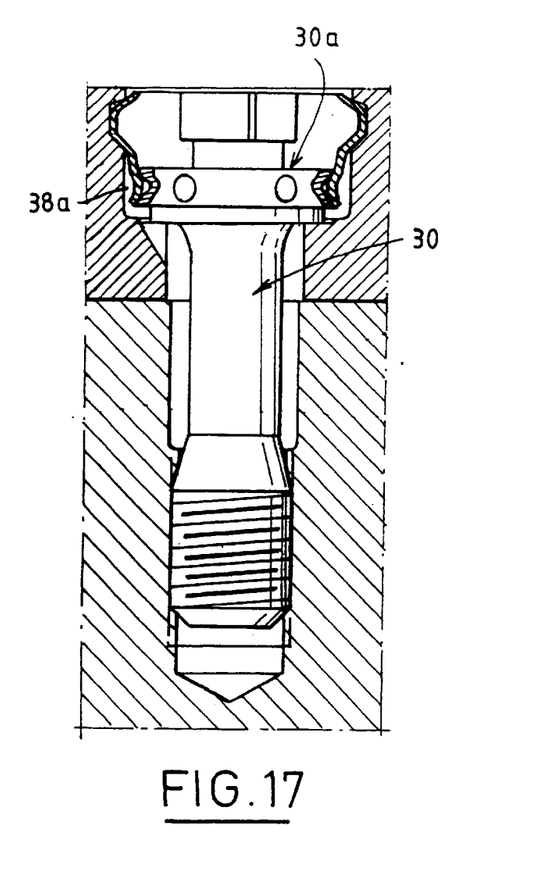
FIG. 17 is a view in axial part section of the joining device according to the invention according to a still further embodiment.

According to a the embodiment represented in FIGS. 15, 16 and 17, three slots 41 at an angle to the axis of the openings 31 and 32 are machined in the edge of the opening 31*b*, so that each slot 41 emerges, at one of its ends, in the opening 31*b* and, at its other end, in the bottom of the opening 31*a* in a region situated at least partially outside of the surface by which the shoulder of the head 30*a* of the screw 30 bears. The shoulder of the head 30*a* of the screw 30 comes to bear against the bottom of the part 31*a* of the opening 31 in the region of an annular cavity remachined in the bottom of the opening 31*a*.

In the case of the first alternative, and as a matter of preference, the three straight openings 39 have a diameter of 2 to 3 mm. In the case of the second alternative, by way of preference, three to six grooves 40 having a width of 1 mm are machined.

In the case of the third alternative, three to six slots having a width of approximately 1 mm are provided.

In all cases, the screw is deconfined by placing the annular space around the screw head in communication with the annular space around the screw shank by simple machining of the baffle which can be carried out from inside the baffle assembly.

The, the openings machined in the baffles to place the annular space around the screw head in communication with the annular space around the screw shank may be produced in a manner other than that which has been described. These openings may have shapes different from than which have been described and may be produced by any machining process which can be implemented underwater inside the baffle assembly of the nuclear reactor.

In the case of the first embodiment, the cup interposed between the head of the screw and the shoulder of the opening in the first plate may have a different shape than the one which has been described. The cup may have any number of radial openings passing through it making it possible to place the annular space around the shank of the screw and the entry part of the opening in the first plate in which the screw head is housed in communication with each other.

The screw head may have a different shape other than those which have been described. In particular, that part of the screw head which is designed to come into engagement with a screwing and unscrewing tool may equally well either have a cylindrical lateral surface in which recesses are pierced, or a lateral surface of prismatic shape.

In order to allow coolant to circulate in the annular space around the shank of the screw and through the openings passing through the baffle or the cup, it is possible to provide a drilling in the second plate constituting, for example, a reinforcement of the baffle assembly, in order to place the annular space around the shank of the screw in communication with a region of the nuclear reactor vessel situated outside the baffle assembly containing the core.

The joining device according to the invention may be used equally well for replacement of a broken screw of a device for fastening baffle plates or for producing a new baffle assembly.

The invention applies equally well to the joining-together of the vertical plates constituting the wall of the baffle assembly in contact with the core assemblies and to the joining of the horizontally-arranged reinforcements to the vertical plates of the baffle assembly.

I claim:

1. In a baffle assembly surrounding the core of a nuclear reactor cooled by pressurized water, a sub-assembly comprising a first metal plate and a second metal plate of the baffle which are located substantially at right angles and in contact with each other and a device for joining said first and second plates including a screw, said screw having a shank which is threaded over at least part of its length and a screw head having a diameter greater than a diameter of said shank, an opening passing through said first metal plate and comprising an entry part having a diameter greater than said diameter of said screw head, an exit part having a diameter between said diameter of said screw head and said diameter of said shank and an annular bearing surface between said entry part and said exit part, and a tapped blind opening in said second metal plate, wherein said joining device further comprises communication means including at least one part for placing a first annular space around said screw head inside said entry part of said opening in communication with a second annular space around said shank of said screw inside said exit part of said opening, and wherein said communication means of said joining device includes a cup adapted to be housed in said entry part of said opening in said first metal plate with a diametral clearance bearing by an end surface of said annular bearing surface between said entry part and said exit part of said opening in said first plate, said cup having an internal bore with an entry section greater in diameter than said screw head and an exit section greater in diameter than said shank of said screw and less than said screw head, said entry and exit sections of said cup being separated by a bearing shoulder against which said screw head bears, said cup having at least one radial through opening between the internal bore and an external surface of a portion of said cup comprised between the bearing shoulder and the end surface, said through-opening constituting the communication part between said first and second annular spaces.

2. The sub-assembly according to claim 1, wherein said screw head includes a bearing shoulder in a shape of a convex spherical sector and said bearing shoulder of said cup consists of a concave spherical sector having a shape corresponding to the shape of the shoulder of said screw head.

3. The sub-assembly according to claim 1, wherein said cup has a first part between the bearing shoulder and the end surface with said at least one radial opening, and a second part which is less thick than said first part constituting a deformable ring with an internal bore which constitutes the entry section of the bore of said cup accommodating said screw head.

4. The sub-assembly according to claim 3, wherein the entry part of the opening passing through said first metal plate has at least one cavity projecting radially towards the outside of the opening emerging in said entry part of said opening for fixing said cup and preventing said cup from rotating in said opening in said first metal plate, by crimping part of said deformable ring into said opening.

5. The sub-assembly according to claim 4, wherein said screw head has at least one cavity for immobilizing said cup on said screw head by crimping a part of said deformable ring into said at least one cavity.

6. In a baffle assembly surrounding the core of a nuclear reactor cooled by pressurized water, a sub-assembly comprising a first metal plate and a second metal plate of the baffle which are located substantially at right angles and in contact with each other and a device for joining said first and second plates including a screw, said screw having a shank which is threaded over at least part of its length and a screw head having a diameter greater than a diameter of said shank, an opening passing through said first metal plate and comprising an entry part having a diameter greater than said diameter of said screw head, an exit part having a diameter between said diameter of said screw head and said diameter of said shank and an annular bearing surface in said first metal plate between said entry part and said exit part, and a tapped blind opening in said second metal plate, wherein said joining device further comprises communication means including at least one opening machined in said first metal plate and constituting a communication part between first and second annular spaces around said screw head and said shank, respectively.

7. The sub-assembly according to claim 1 or 6, wherein the face of said first metal plate on which the end of said through-opening emerges forms a recess communicating with the entry part of said through-opening and inclined toward the inside of said through-opening passing through said first metal plate.

8. The sub-assembly according to claim 6, wherein said opening machined in said first metal consists of a straight drilling at an angle with respect to the axis of the opening in which said screw is arranged, having a first end emerging in the bottom of said entry part of said opening in which said screw is arranged and a second end emerging in the exit part of the opening in which said screw is arranged.

9. The sub-assembly according to claim 6, wherein the communication part between said first and said second annular space consists of a radial groove perpendicular to the axis of the opening in which said screw is arranged machined in the bottom of said entry part and emerging in said exit part of the opening in which said screw is arranged.

10. The sub-assembly according to claim 6, wherein the communication part consists of a slot at an angle to the axis of the opening in which said screw is arranged machined in the edge of said exit part and placing in communication the bottom of said entry part and said exit part of the opening in which said screw is arranged.

11. The sub-assembly according to claim 6, wherein said communication part between said first and said second annular spaces consists of three openings machined in said first metal plate and arranged at 120° from one another about the axis of the opening in which said screw is arranged.

* * * * *